United States Patent
Aho

(12) 
(10) Patent No.: US 6,185,215 B1
(45) Date of Patent: Feb. 6, 2001

(54) COMBINED ROUTER, ATM, WAN AND/OR LAN SWITCH (CRAWLS) CUT THROUGH AND METHOD OF USE

(75) Inventor: Michael E. Aho, Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 08/732,552

(22) Filed: Oct. 15, 1996

(51) Int. Cl.⁷ .......................... H04L 12/28; H04L 12/56; H04J 3/16; G01R 31/08

(52) U.S. Cl. .......................... 370/402; 370/465; 370/218

(58) Field of Search .................. 370/428, 429, 370/465, 217, 218, 225, 228, 401, 402, 397, 352, 399

(56) References Cited

U.S. PATENT DOCUMENTS

| | | | |
|---|---|---|---|
| 5,452,293 | 9/1995 | Wilkinson et al. | 370/54 |
| 5,452,296 | 9/1995 | Shimizu | 370/60.1 |
| 5,453,979 | 9/1995 | Shibler et al. | 370/60.1 |
| 5,500,860 | * 3/1996 | Perlman et al. | 370/401 |
| 5,521,913 | * 5/1996 | Gridley | 370/389 |

OTHER PUBLICATIONS

ATM Year 96, May 6–9, 1996, San Jose, CA, Session: IP/ATM Protocol Research, Speaker: Mr. Tom Lyon, Founder & Chief Technical Officer, Ipsilon Networks, Inc., pp. 1–10.

Data Communications, May 1996, "ATM's Soft Side", by Nick Lippis, Strategic Networks Consulting Inc., pp. 31–32.

Spring 1996, Ipsilon Networks, Inc., vol. 1, No. 1.2, "Ipsilon Premieres First IP Switch", The IP Switching Advantage, pp. 1–4.

* cited by examiner

*Primary Examiner*—Michael Horabik
*Assistant Examiner*—Kevin C. Harper
(74) *Attorney, Agent, or Firm*—Daniel E. Venglarik; Andrew J. Dillon

(57) ABSTRACT

A cut through is provided in a combined router/switch in a data processing system network by having the router store and forward a first portion of a data flow from a source to a destination. The router determines whether the data flow is suitable for cut through. If found suitable, the router sends a redirect protocol to the source, directing the source to use a different destination address for all or part of the remainder of the data flow. The portion of the data flow having new destination address is then cut through the combined router/switch by the switch. If the cut through has a failure, responsibility for the data flow delivery returns to the router. If the destination of a cut through data flow is unavailable, the frames are stored by the switch and forwarded when the destination is available.

19 Claims, 14 Drawing Sheets

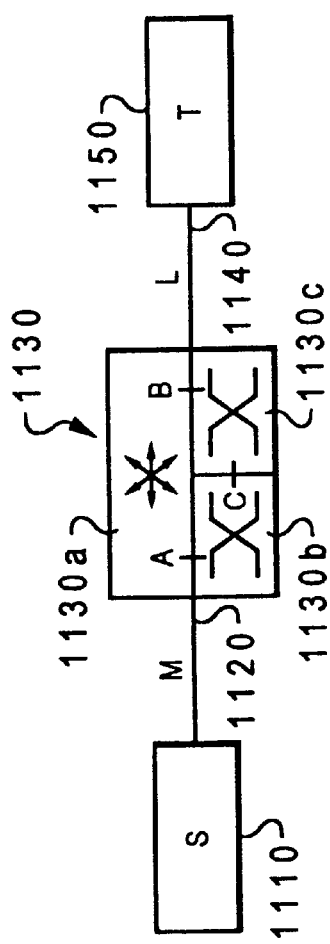
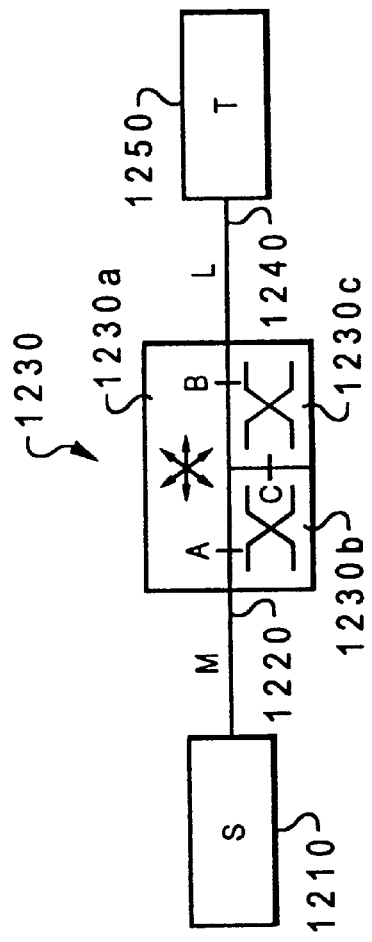

COMBINED ROUTER, ATM, WAN AND/OR LAN SWITCH (CRAWLS) CUT THROUGH AND METHOD OF USE

BACKGROUND OF THE INVENTION

1. Technical Field

The present invention relates in general to combined routing and switching devices in computer networks and in particular to such devices in local area network and wide area network environments. Still more particularly, the present invention relates to improving performance of combined routing and switching devices used in local area networks and wide area networks by providing a cut-through.

2. Description of the Related Art

The past decade has seen an explosion in the use of computer networks in all sectors of society: business and industry, education and research, and even recreation. This growth in the use of computer networks has been accompanied by a proportional demand for improvement of the performance of such networks.

Computer networks are classified by their geographic scope. The most commonly used terms for classifying computer networks are local area network (LAN) and wide area network (WAN). LANs are generally limited to computers within a relatively small area, such as a building, office or campus. WANs, on the other hand, connect computers over larger geographic scopes, such as from one city to another. Less commonly used terms for classifying computer networks include metropolitan area network (MAN) and global area network (GAN), which have self-explanatory geographic scopes. Currently the Internet is the most prominent example of a global area network.

Various technologies have evolved for communications and/or data transmission in computer networks, including Ethernet, token ring, fiber distributed data interface (FDDI), and asynchronous transfer mode (ATM). Data transmission within and between networks using such technologies are governed by various protocols, such as frame relay (FR), X.25, integrated services digital network (ISDN), media access control address protocol, and transmission convergence protocol/internet protocol (TCP/IP).

As with other forms of digital communications, data in computer networks is commonly transmitted in packets or frames, i.e.—discrete bundles of data. Frames are comprised of various fields, such as header, address, data, and control fields. The arrangement or format of these fields within a frame is protocol-dependent. An explanation of some frame formats commonly used in computer networks may be found in Internet Engineering Task Force (IETF) Request for Comments (RFC) 1490, which is incorporated herein by reference. However, it will be understood by those skilled in the art that RFC 1490 is not exhaustive of all frame formats currently in use.

A given communications or data transmission process in a network often requires delivery of multiple packets or frames of data from a source to a destination within the network. For example, retrieval of a file using file transfer protocol (FTP) will generally be accomplished using a large number of frames. Although relating to the same process (i.e., FTP), different frames may be transmitted via different paths within the network. As used herein, a data flow refers to a sequence of related frames sent from a particular source to a particular destination within the network.

Various devices exist for transmitting packets or frames of data within a network or between networks. A bridge or gateway—the terms are often used interchangeably—passes frames of data from one network to another, the two networks typically being local area networks. FIG. 1 illustrates a bridge connecting two token ring LANs, while FIG. 2 depicts a bridge linking an Ethernet LAN to a token ring LAN. Bridges store and forward frames of data, looking only at the low-level addressing and not at the frame's internal data to determine where the frames are sent.

Routers are an evolution beyond bridges, usually routing frames of data at a higher level protocol than is handled by bridges. The oldest routers were internet protocol (IP) routers, but other protocols may be routed including Inter-PacketExchange (IPX) by Novell, Inc. and high performance routing (HPR) by International Business Machines Corporation of Armonk, N.Y. Like bridges, routers store and forward frames. However, a router, after storing a frame of data, looks into the internal data of the frame for higher protocol information regarding the ultimate destination of the frame. A router then consults an internal table of available paths to the ultimate destination and corresponding protocols supported by those paths, and makes a decision regarding how to route the frame to its ultimate destination.

If a router encounters a frame of data not fitting into the list of protocols which it routes, it bridges the frame. Routers will attempt to route first, then bridge. As shown in FIG. 3, which illustrates an example of a router, a router usually has more than two connections to disparate LANs or WANs. Routers may also be required to interface between multiple protocols.

A switch is a hardware device providing physical connection within or between different networks. Unlike bridges and routers, a switch typically forwards data without first storing the entire frame. The delays inherent in storing the entire frames before forwarding are thus eliminated. A switch transmits the data bits of the frame received from the source port directly to the destination port as soon as the destination is ascertained. Switches are often used as part of virtual circuits (VCs), or defined paths between a given source or destination. A virtual circuit may be either a switched virtual circuit (SVC) or a permanent virtual circuit (PVC). Switched virtual circuits are transient, set up for the benefit of a given process or data flow, and may result in different paths being used between the same source and destination for discrete processes. Permanent virtual circuits (PVCs) are defined paths between a source and destination using designated nodes in a predetermined sequence.

Switches were first used in telephone networks and other WANs. In WAN environments, for example, Frame Relay and ATM protocols are capable of using switches. FIG. 4 depicts an example of a WAN using Frame Relay switches to connect LANs. Routers within the LANs which connect the LAN to the WAN must have Frame Relay Access Devices (FRAD) attached.

Despite their origins in the WAN environment, switches are beginning to be used in LAN implementations. To improve high-demand, high-bandwidth data delivery, the network industry is attempting to overcome latency (delay) in routers by going to switching technologies. LAN technologies such as Ethernet and token ring have been adapted to use switches. ATM, which may operate through switches, works in either LAN or WAN environments. FIG. 5 illustrates an example of a switch in a network LAN environment. FIGS. 6 and 7 depict examples of Ethernet and token ring switches, respectively.

As switching is implemented in LAN environments, LAN connections have moved from shared access transport (SAT)

sharing of media to connecting directly to switch ports. The LAN framing remains unchanged, but data flows attempt to pass or "cut through" the switch. Cut through avoids completely storing the frame before forwarding it, passing through the bits as soon as the destination port is known. Adaptive cut through is a variation which seeks to avoid wasting frames if the destination port is already busy by storing the frame in the switch until the destination is available.

The current trend in network implementation is to use both routing and switching together at a network node. Products are being developed which combine routers—especially IP routers—with switches. However, although physically combined in a single package for use at network nodes, functional combination of routers and switches has been limited. Generally routers in such combined packages communicate with the network through the switches, but routing and switching technologies are not being used synergistically in networks to take full advantage of both technologies. For example, a need exists for a method of using routing at the beginning of certain network data flows, then changing over to switching to improve data throughput by removing routing latency. This need exists in all LAN-to-LAN, LAN-to-WAN, and WAN-to-WAN connections.

SUMMARY OF THE INVENTION

It is therefore one object of the present invention to provide an improved method of using combined routing and switching devices in computer networks.

It is another object of the present invention to provide an improved method of using combined routing and switching devices in both local area and wide area computer networks.

It is yet another object of the present invention to provide a method of cut-through in combined routing and switching devices used in local area and wide area computer networks to improve data throughput.

The foregoing objects are achieved as is now described. A cut through is provided in a combined router/switch in a data processing system network by having the router store and forward a first portion of a data flow from a source to a destination. The router determines whether the data flow is suitable for cut through. If found suitable, the router sends a redirect protocol to the source, directing the source to use a different destination address for all or part of the remainder of the data flow. The portion of the data flow having new destination address is then cut through the combined router/switch by the switch. If the cut through has a failure, responsibility for the data flow delivery returns to the router. If the destination of a cut through data flow is unavailable, the frames are stored by the switch and forwarded when the destination is available.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 16 is a block diagram of a network portion containing a CRAWLS for ATM-to-frame-relay cut through in accordance with a preferred embodiment of the present invention.

FIG. 17 depicts a block diagram of a network portion containing a CRAWLS for frame-relay-to-ATM cut through in accordance with a preferred embodiment of the present invention.

DETAILED DESCRIPTION OF THE PREFERRED EMBODIMENT

Figure 1:
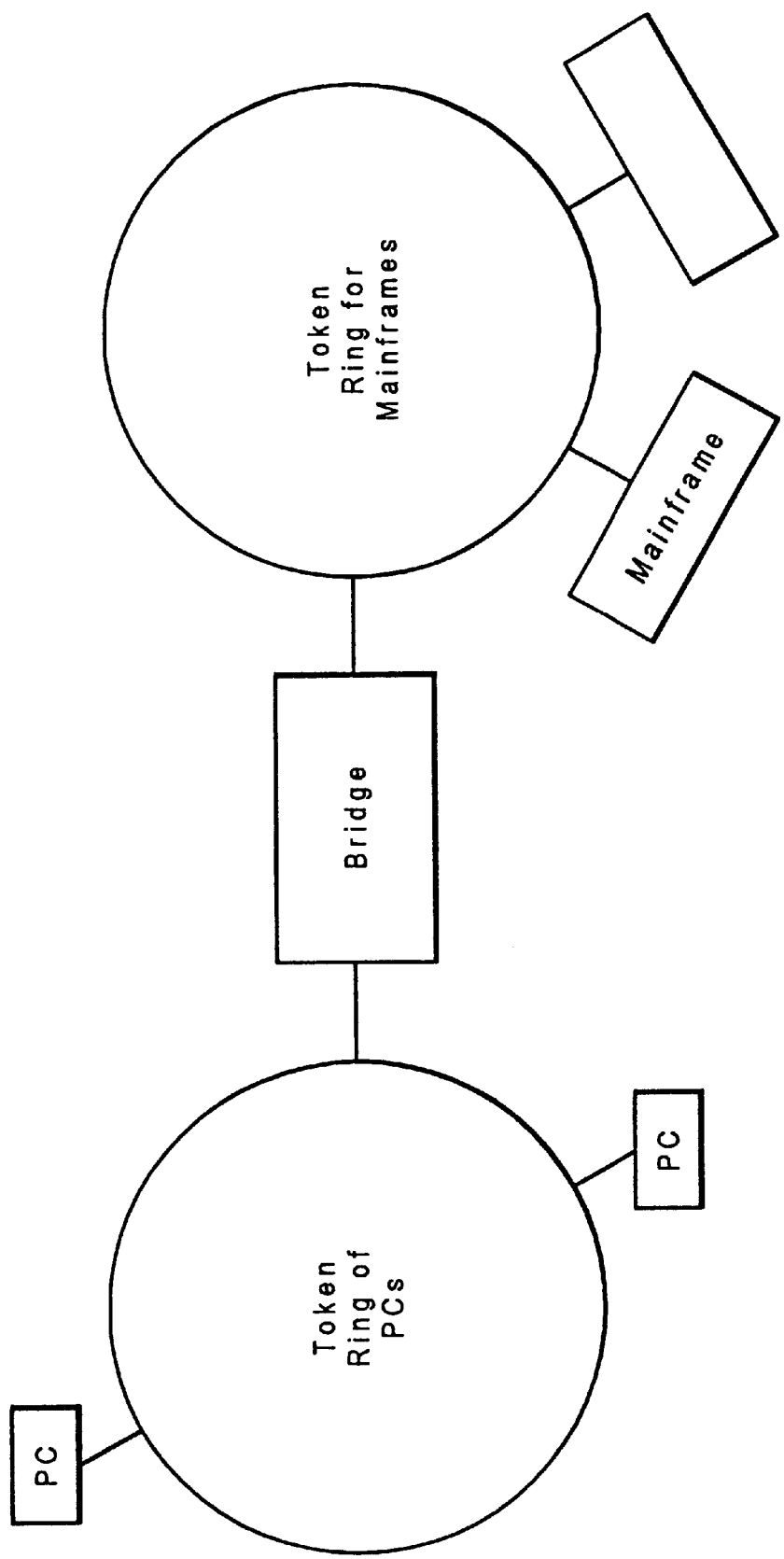
FIG. 1 depicts a block diagram of a conventional bridge connecting two token ring LANs.
Figure 2:
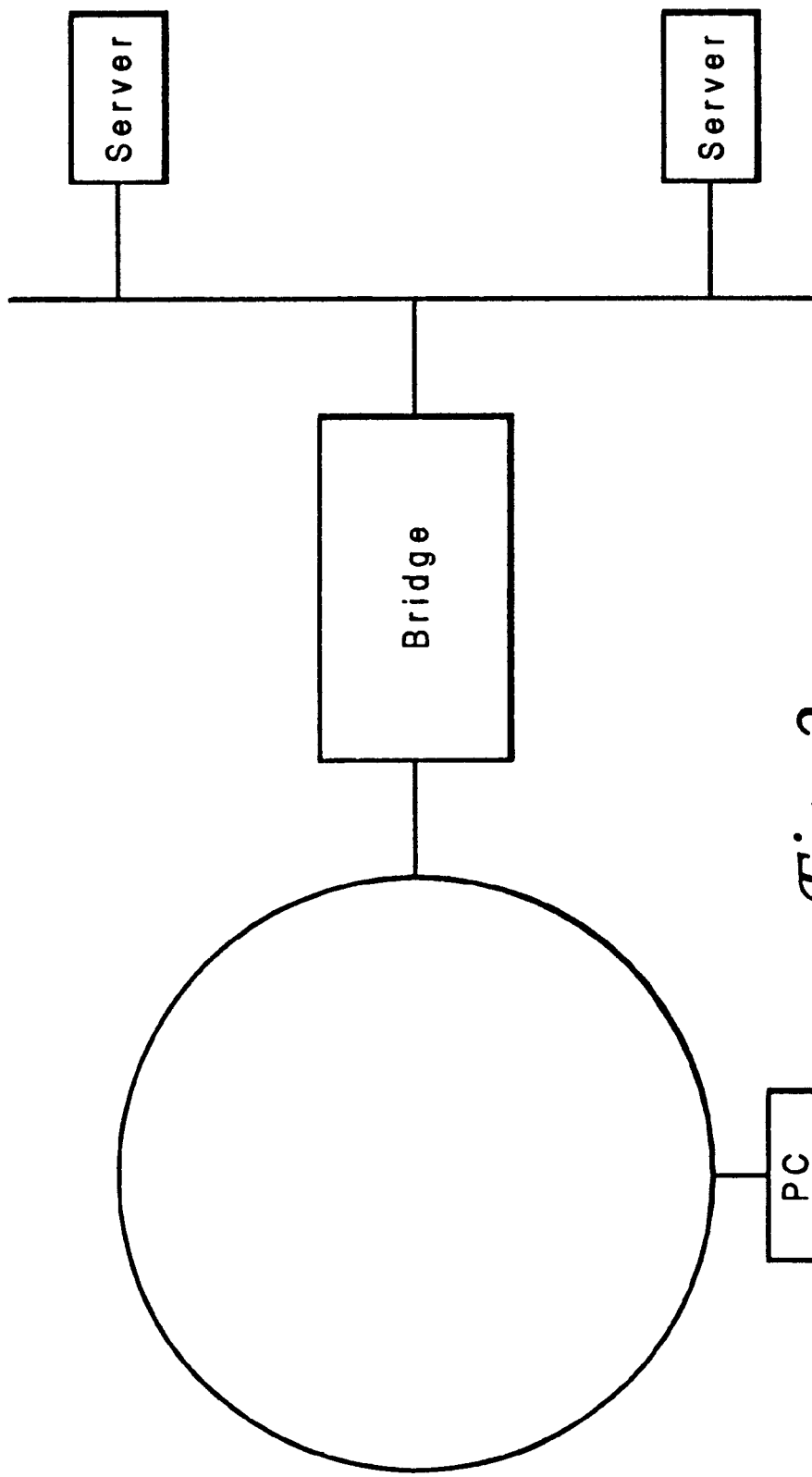
FIG. 2 is a block diagram of a conventional bridge linking an Ethernet LAN to a token ring LAN.
Figure 3:
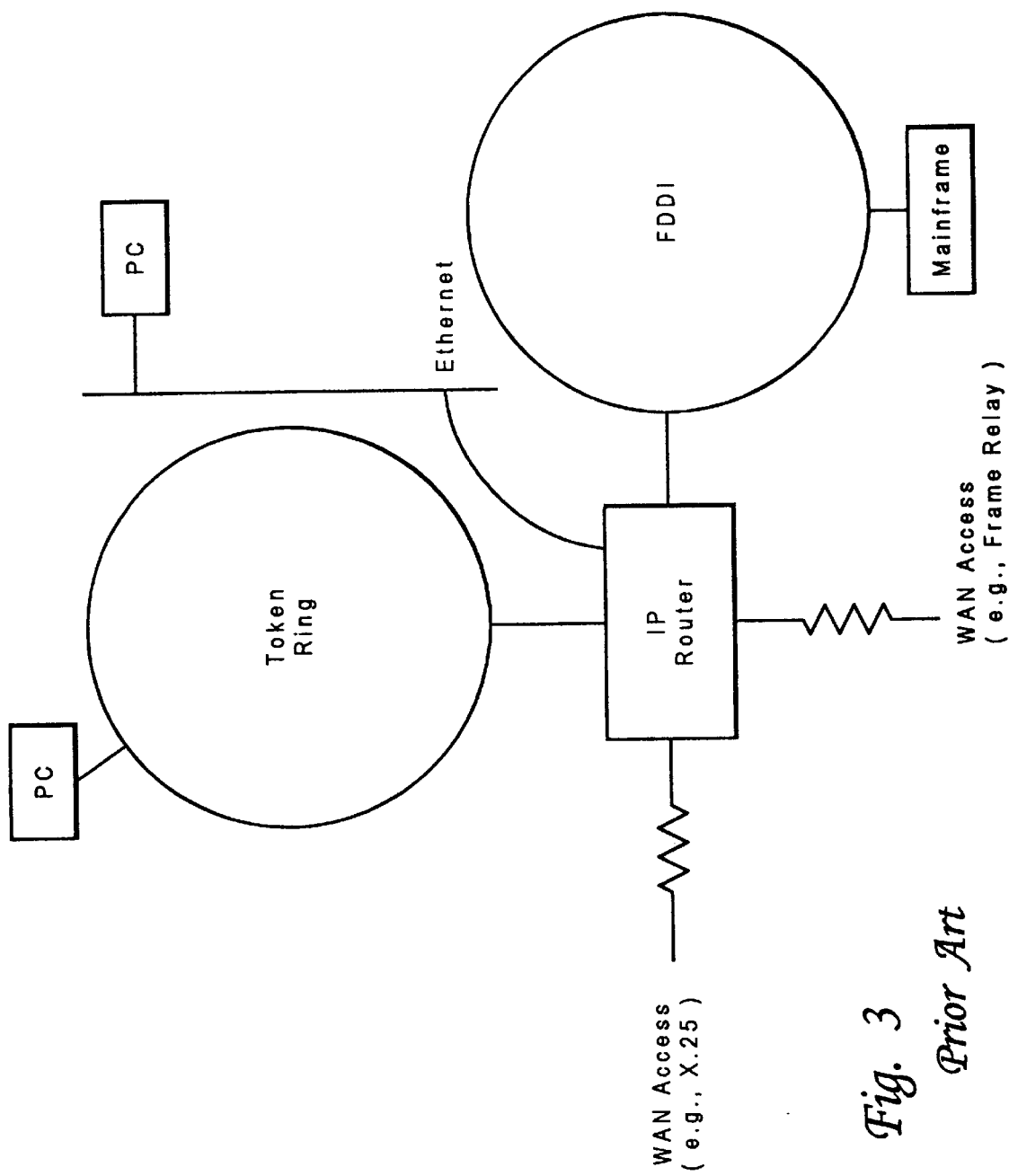
FIG. 3 depicts a block diagram of an example of a conventional router.
Figure 4:
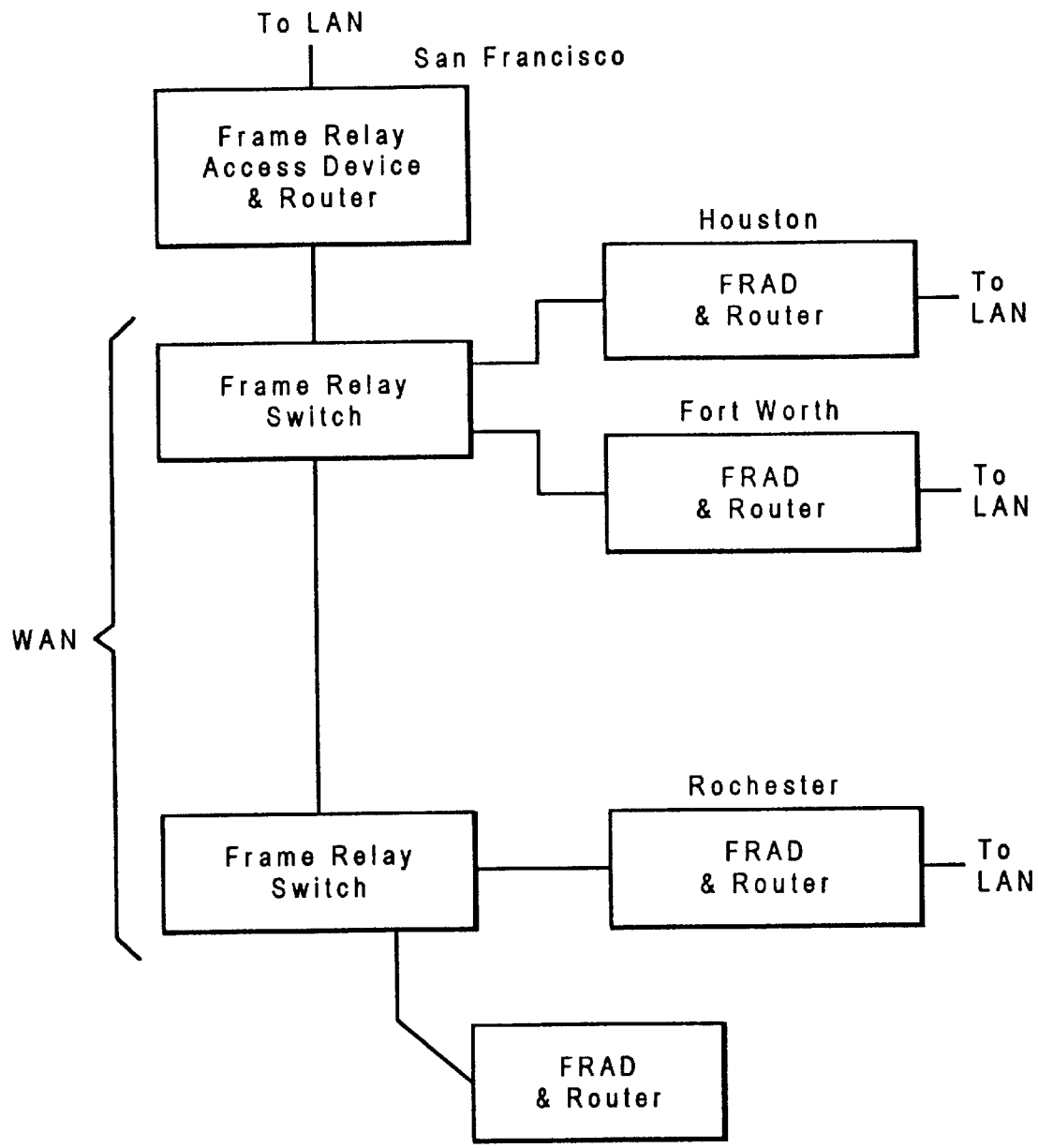
FIG. 4 is a block diagram of an example of a WAN using conventional Frame Relay switches.
Figure 5:
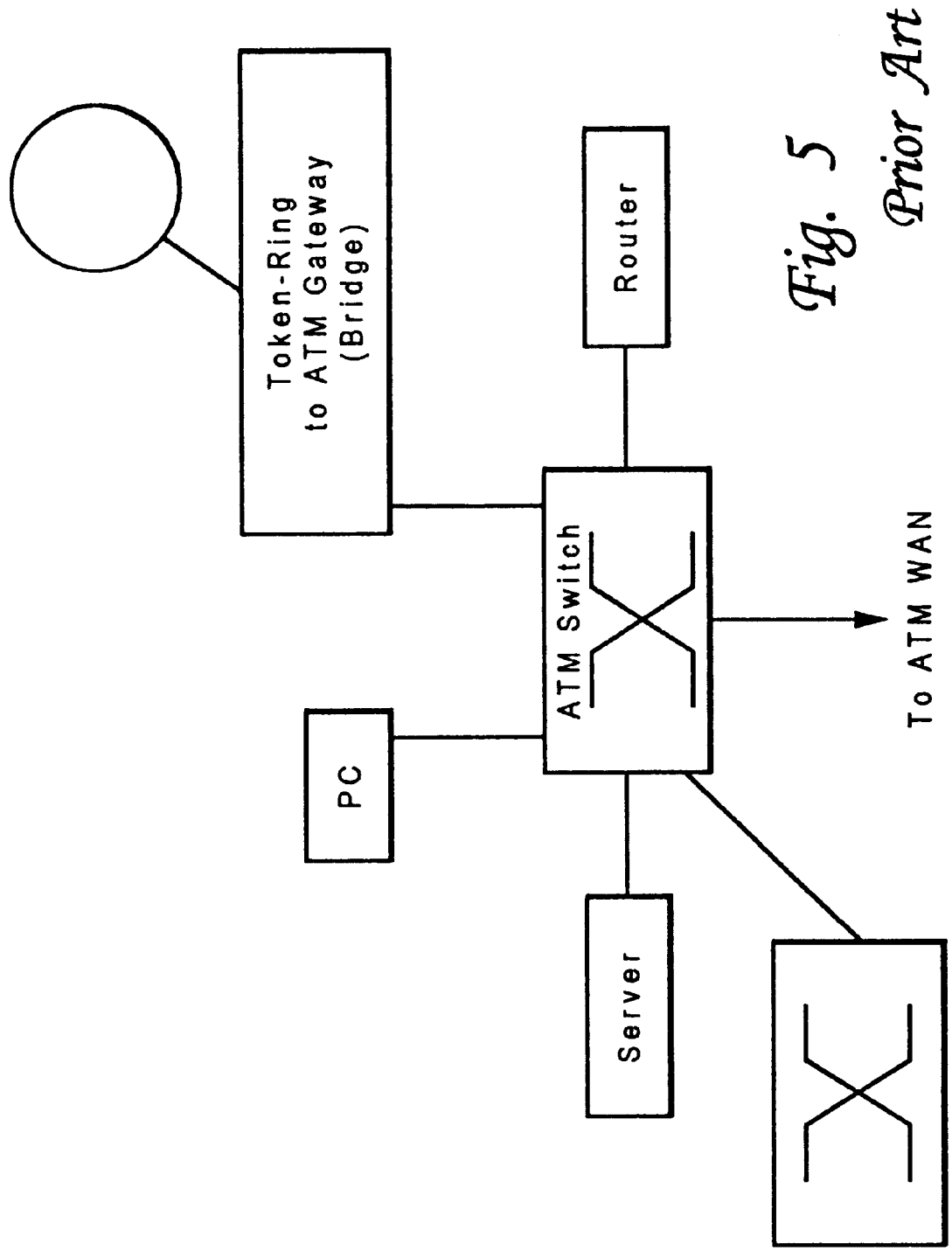
FIG. 5 depicts a block diagram of an example of a conventional ATM switch in a network LAN environment.
Figure 6:
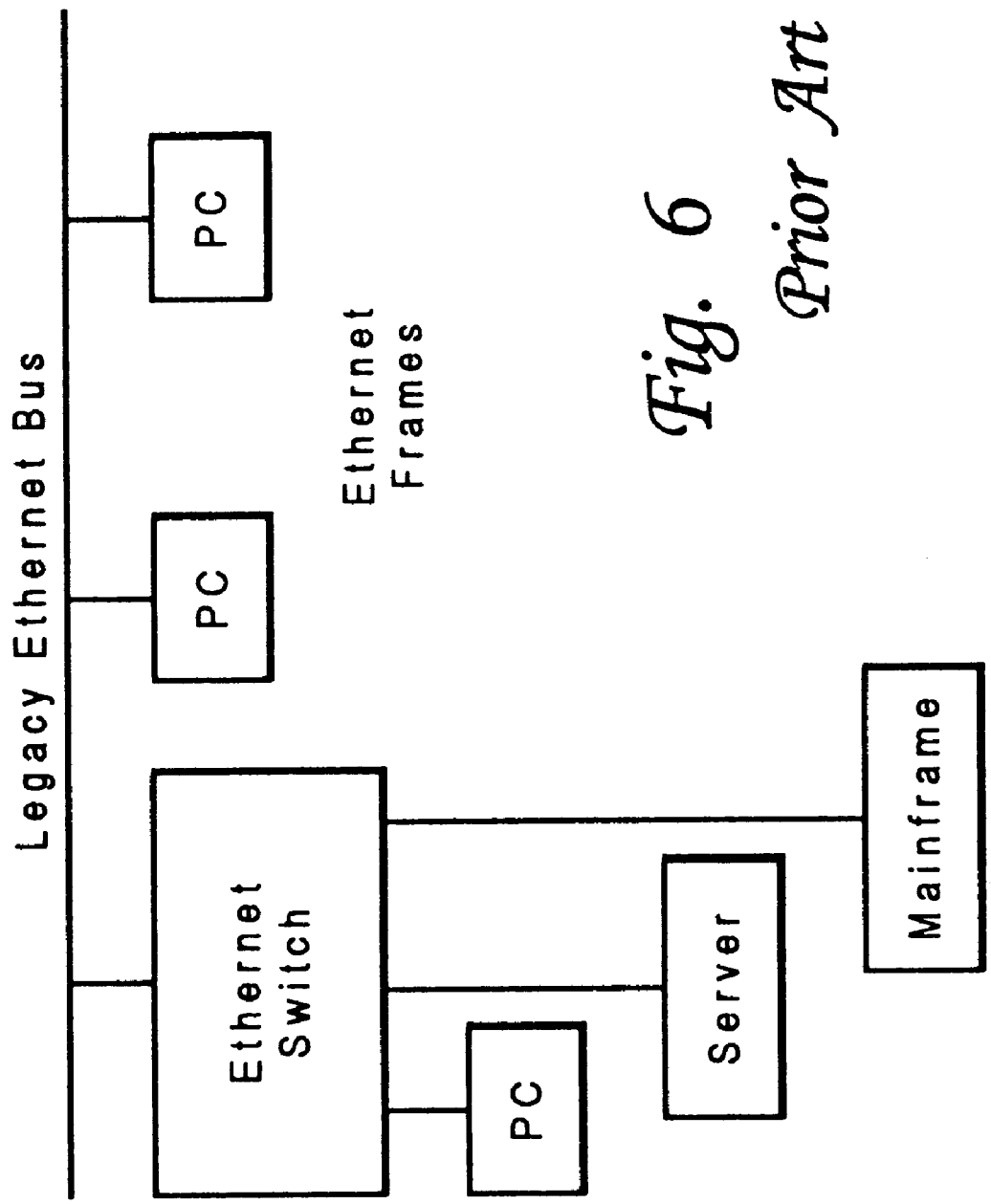
FIG. 6 is a block diagram of an example of a conventional Ethernet switch.
Figure 7:
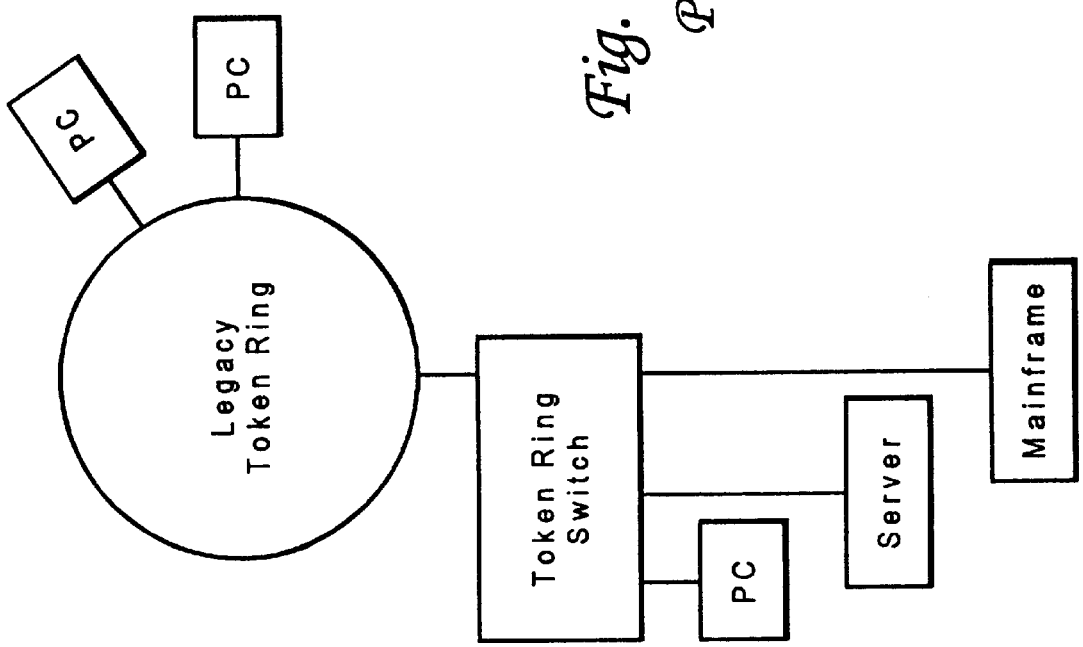
FIG. 7 depicts a block diagram of an example of a conventional token ring switch.
Figure 8:
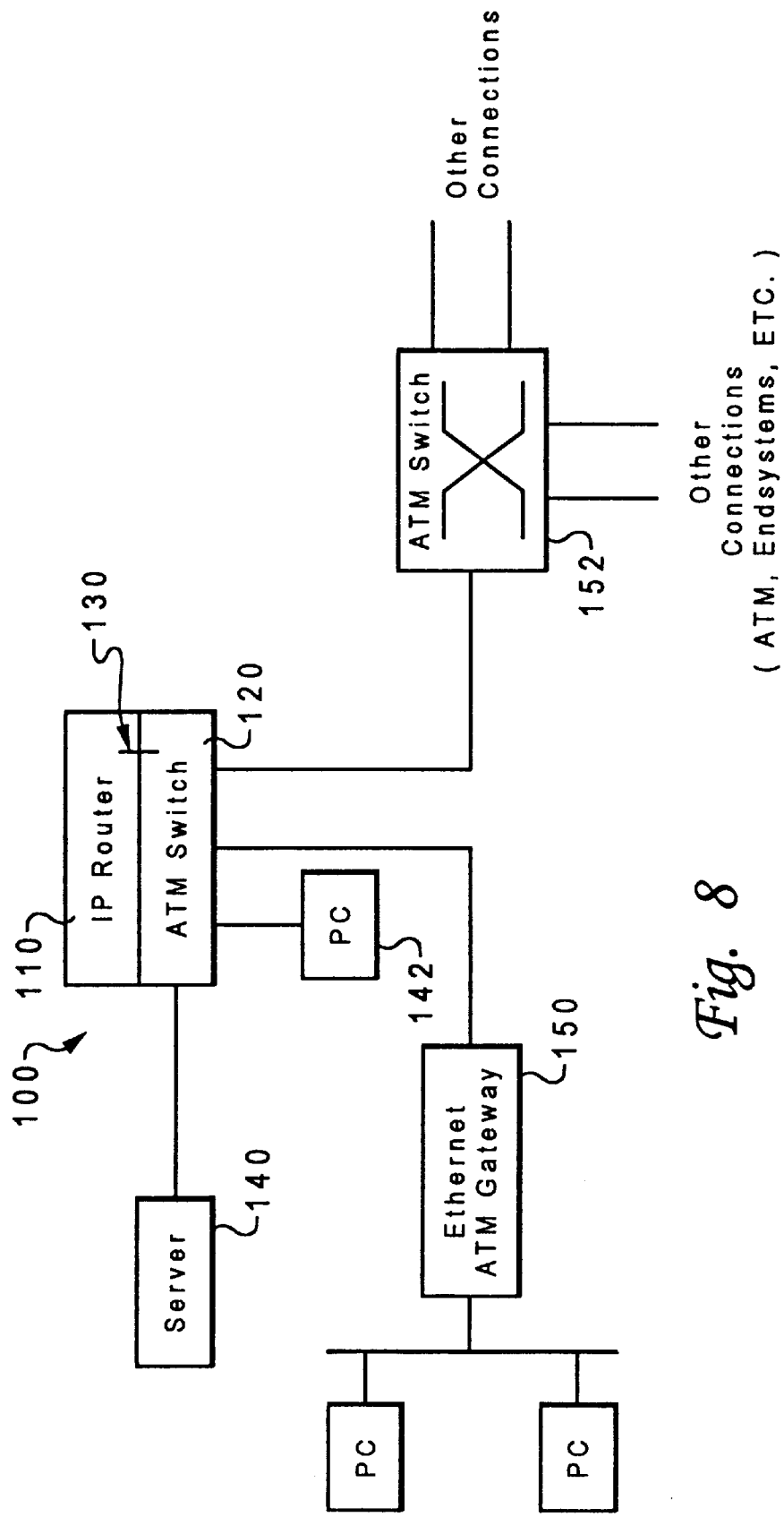
FIG. 8 is a block diagram of a simple example of combining router and switch technologies for use in a preferred embodiment of the present invention.

With reference now to the figures and in particular with reference to FIG. 8, a simple example of combining router and switch technologies for use in a preferred embodiment of the present invention is illustrated. The combination router/switch 100 includes an IP router 110 connected with an ATM switch 120 through an internal connection 130. Frame traffic from a source 140 or 142 to be routed by router 110 is received by switch 120. Internal connection 130, which has a ATM-type address, allows switch 120 to forward this frame traffic to router 110. Frames forwarded from router 110 to another network node 150 or 152 are passed through switch 120.

Figure 9:
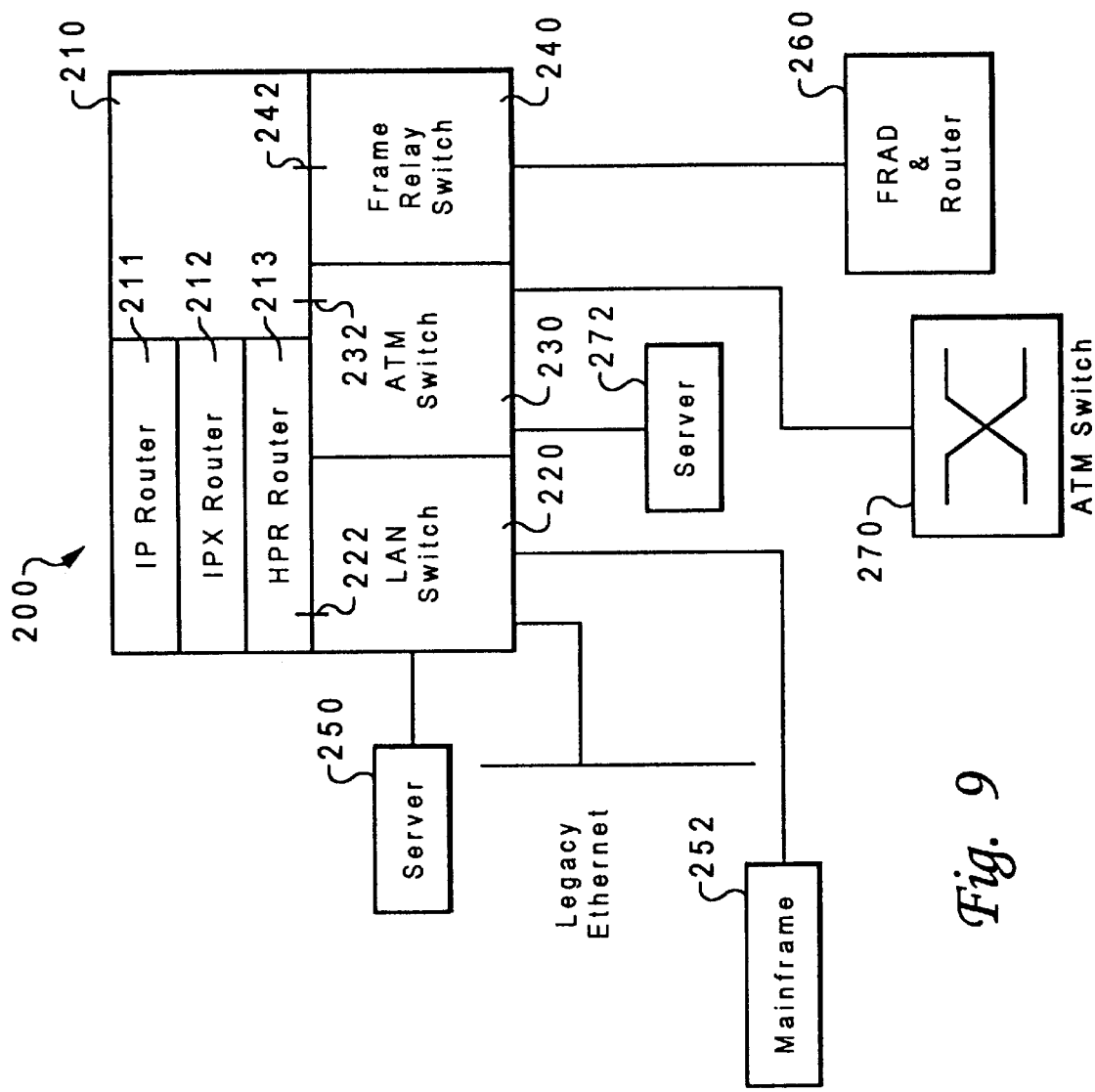
FIG. 9 depicts a block diagram of a more sophisticated but more generally useful example of synergistically combining routing and switching technologies for use in a preferred embodiment of the present invention

Referring to FIG. 9, a more sophisticated but more generally useful example of synergistically combining routing and switching technologies for use in a preferred embodiment of the present invention is depicted. The combined router/switch 200 includes a router 210 which may handle multiple routing protocols such as IP 211, IPX 212, and HPR 213. Also included are ATM, frame relay, and LAN switches 220, 230, and 240, which are linked to router 210 via internal connections 222, 232, and 242 respectively. Frame traffic to and from router 210 passes through one or more of the switches 220, 230 and 240 depending on whether the source-destination connection is LAN-to-LAN, LAN-to-WAN/WAN-to-LAN, or WAN-to-WAN. For example, suppose combined router/switch 200 is positioned as the interface between a LAN and the remainder of a WAN including the LAN. LAN-to-LAN traffic from a source 250 to a destination 252 will pass through LAN switch 220 both to and from router 210. LAN-to-WAN traffic from a source 250 to a destination 260 may pass through LAN switch 220 on the LAN side and through frame relay switch 240 on the WAN side. WAN-to-WAN traffic may pass, as appropriate, from a source 270 to a destination 272 only through ATM switch 230, or from a source 270 through ATM switch 230 to router 210 and from router 210 through frame relay switch 240 to destination 260. Those skilled in the art will understand that numerous variations of switching paths are possible.

Although shown as one entity in FIGS. 8 and 9, the combined router and switch(es) need not be physically combined in a single, discrete piece of hardware to be used in accordance with a preferred embodiment of the present invention. It will be understood by those of ordinary skill that other hardware implementations may be equally acceptable. For example, a network node having a switch and a router connected to the network through the switch may be used to the same effect. As used herein, the term "combined router and switch" refers generally to combinations of routers and switches, however achieved, and regardless of whether the combined router and switch is used in an ATM, WAN, or LAN environment or some other alternative network environment.

LAN-to-LAN

Figure 10:
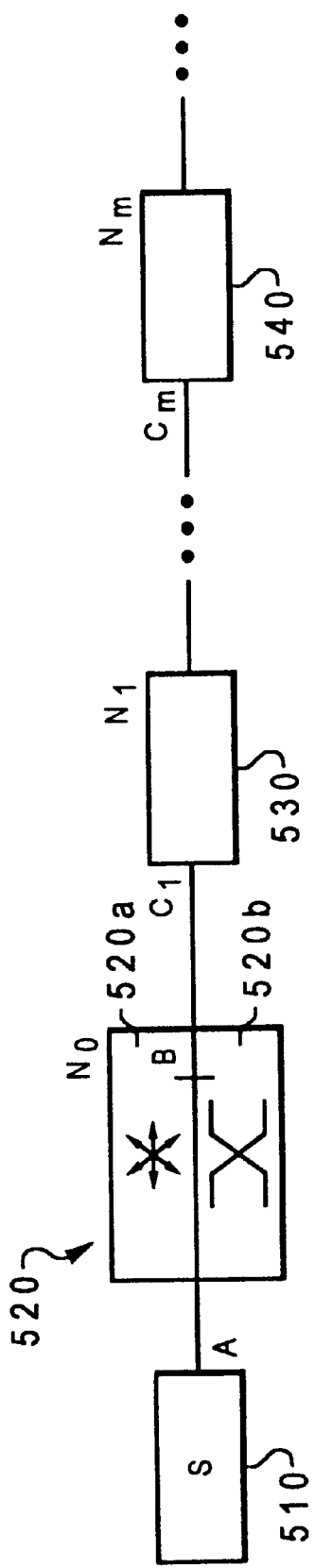
FIG. 10 is a block diagram of a portion of a LAN-to-LAN network connection containing a CRAWLS in accordance with a preferred embodiment of the present invention.

With reference now to FIG. 10, a portion of a LAN-to-LAN network connection containing a CRAWLS in accordance with a preferred embodiment of the present invention is illustrated. The network portion of interest 500 includes a source 510 attempting to deliver a data flow to a destination (not shown). Use of a series of intermediate nodes $N_0$, $N_1$, . . . , $N_m$ is required for source 510 to reach the destination required for the particular process being executed. Node $N_0$ 520 is a CRAWLS including a router 520a and a switch 520b. Addressing for this example is in media access control (MAC) format.

Frames from source 510 having source address A are routed by router 520a to the next node $N_1$. Frames are received in the CRAWLS 520 from source 510 at internal MAC address B in router 520a. Router 520a routes the frames to the next node $N_1$ 530 from source address B to destination address $C_1$. Router 520a determines if a data flow from source address A to destination address $C_1$ is suitable for cut through. Processes which require substantial throughput, such as file transfers (including FTP), remote access (including Telnet), or hypertext transmission protocol (HTTP) transfers will result in data flows suitable for cut through. Processes requiring short lived frame traffic, such as e-mail or simple network management protocol (SNMP) queries, may be less suitable or even unsuitable for cut through. Cut through is unsuitable when establishing the cut through would increase latency of the total data flow.

In LAN-to-LAN connections, CRAWLS 520 may provide a simple cut through in which router 520a sends source 510 a redirect protocol frame. The redirect protocol directs source 510 to use destination address $C_1$ for all or part of the remaining data flow related to the process being executed. If the redirect protocol is accepted, frame traffic from source 510 previously addressed to router 520a and routed to node $N_1$ is now addressed by source 510 to destination address $C_1$ of node $N_1$. The remaining portion of the data flow for the process being executed, bearing the destination address $C_1$, is then cut through CRAWLS 520 by switch 520b directly to node $N_1$.

It is important to note that the present invention is not limited to a particular device—e.g., a combined router/switch—provided at a particular node within the network. The benefits of the present invention may best be achieved by using the methods disclosed at multiple nodes within the network. For example, source 510 must be capable of responding to a redirect protocol sent by router 520a by changing the destination address of frames within a given flow. Thus, for all or part of the routed frame traffic in network 500, nodes $N_1$ 530 through $N_m$ 540 may also be CRAWLS, each sending redirect protocols upstream for simple cut through. Thus node $N_i$ would cut through frame traffic from node $N_{i-1}$ to node $N_{i+1}$. Frame traffic from source 510 would then be switched through each of nodes $N_0$, $N_1$, . . . $N_m$ directly through to the destination.

An alternative to simple cut through in LAN-to-LAN connections is using a MAC address proxy (MACAP) cut through. Rather than node $N_1$ address $C_1$, router 520a sends a redirect protocol frame to source 510 directing source 510 to use proxy MAC address G for all or part of the remaining data flow. Router 520a and switch 520b cooperate in generating proxy address G and registering this address within substitution tables in switch 520b. When switch 520b subsequently sees destination MAC address G, it substitutes address $C_1$ and forwards the frame to node $N_1$. If node $N_1$ subsequently communicates a new destination MAC address—real or proxy—to router 520a in node $N_0$ 520, router 520a updates the substitution table in switch 520b. Thereafter, when switch 520b sees destination MAC address G, it substitutes destination address H and sends the frame to the same switch port as it did for address $C_1$.

LAN-to-WAN/WAN-to-LAN

Figure 11:
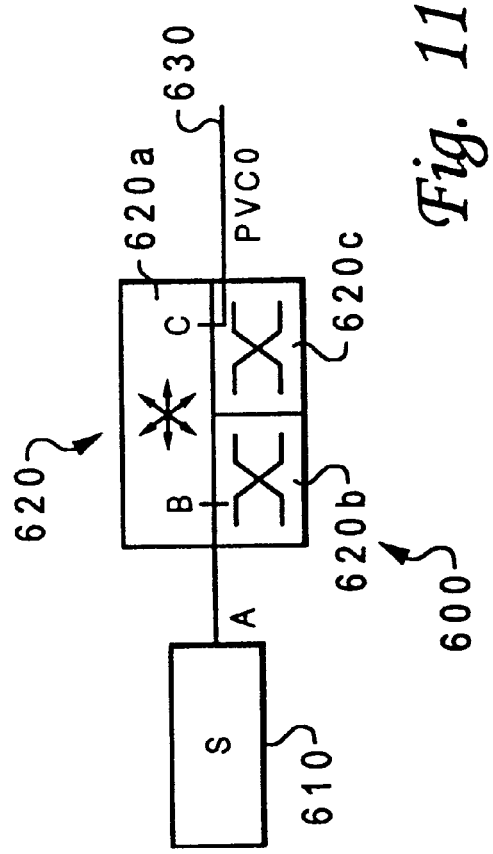
FIGS. 11 and 12 depict block diagrams of portions of LAN-to-WAN network connections containing a CRAWLS in accordance with a preferred embodiment of the present invention.

Referring to FIG. 11, a portion of a LAN-to-WAN network connection containing a CRAWLS in accordance with a preferred embodiment of the present invention is depicted. The network portion of interest 600 includes a source 610 connected to a CRAWLS 620 and attempting to deliver a data flow to a destination (not shown). The example depicted assumes that a frame relay protocol is used for LAN-to-WAN access. CRAWLS 620 includes frame relay switch 620c as well as router 620a and LAN switch 620b. Internal address C in frame relay switch 620c maps to PVC 0 630.

If the frame relay traffic in the LAN-to-WAN connection is bridged LAN traffic in accordance with RFC 1490, the procedures described above for LAN-to-LAN connections may also be applied to the LAN-to-WAN connection. However, another MACAP method specific to frame relay may be applied to LAN-to-WAN connections which are frame relay direct traffic in accordance with RFC 1490 (e.g., IP/FR, HPR/FR). Upon determining that a data flow is suitable for cut-through, router 620a cooperates with LAN switch 620b, and possibly with frame relay switch 620c, to generate a proxy MAC address K. The proxy MAC address K is registered in LAN switch 620b as mapping to PVC 0 630. Router 620a then sends a redirect protocol to source 610 directing source 610 to use destination address K for all or part of the remainder of the data flow previously using internal MAC address B within the CRAWLS as a destination address. When LAN switch 620b detects destination address K in subsequent frames, the frames are sent directly down PVC 0 630 through destination address F.

In an enhanced or adaptive version of this MACAP method for LAN-to-WAN connections, transmission of frames down PVC 0 630 is begun before the entire frame arrives. That is, as soon as LAN switch 620b determines that destination address K maps to PVC 0 630, LAN switch 620b informs frame relay switch 620c of the incoming frame traffic. If PVC 0 630 is unavailable, frame relay switch 620c stores the frame for forwarding when PVC 0 630 becomes available. Once PVC 0 630 becomes available, frame relay switch 620c begins transmission of the frame—even if PVC 0 630 became available before the entire frame was stored.

Figure 12:
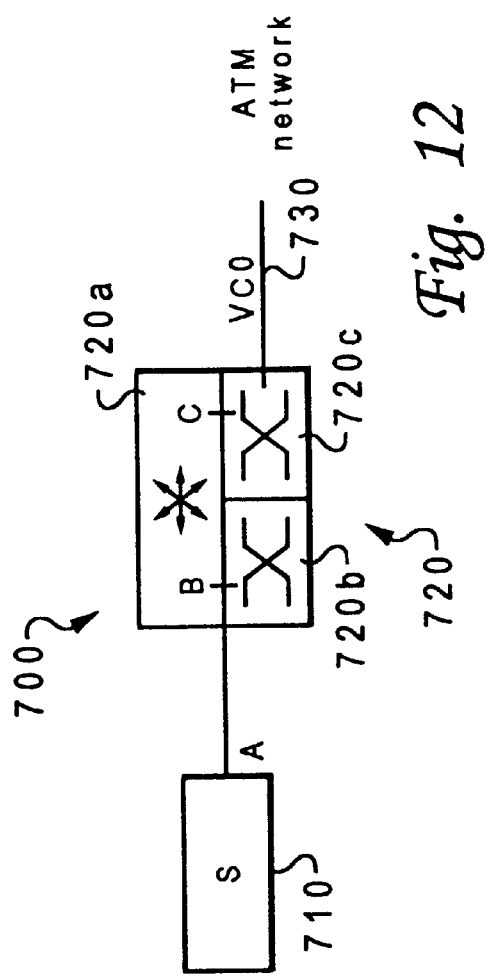

With reference now to FIG. 12, a portion of a LAN-to-WAN network connection containing a CRAWLS in accordance with a preferred embodiment of the present invention is depicted for an example which assumes that an ATM protocol is used for LAN-to-WAN access. This is essentially the same as a CRAWLS where frame relay protocol is used for LAN-to-WAN access, except an ATM VC is used without regard to whether the VC is a PVC or an SVC. The network portion of interest 700 includes a source 710 connected to a CRAWLS 720 and attempting to deliver a data flow to a destination (not shown). CRAWLS 720 includes router 720a, LAN switch 720b, and ATM switch 720c. Internal address C in ATM switch 720c maps to VC 0 730. Upon determining that a data flow is suitable for cut-through, router 720a cooperates with LAN switch 720b, and possibly with ATM switch 720c, to generate a proxy MAC address K. The proxy MAC address K is registered in LAN switch 720b as mapping to VC 0 730. Router 720a then sends a redirect protocol to source 710 directing source 710 to use destination address K for all or part of the remainder of the data flow previously using internal MAC address B within the CRAWLS as a destination address. When LAN switch 720b detects destination address K in subsequent frames, the frames are sent directly to ATM switch 720c to be sent down VC 0 730.

As with the LAN-to-WAN CRAWLS where frame relay protocol was used for LAN-to-WAN access, a LAN-to-WAN CRAWLS using ATM protocol may be enhanced for adaptive cut through. In this case, frames are segmented into cells as each frame is received by ATM switch 720c from LAN switch 720b. As soon as any cell(s) of an incoming frame are available, ATM switch 720c transmits the cell(s) on VC 0 730 into the ATM network.

Those skilled in the art will recognize that the above described methods can be adapted for a LAN-to-WAN CRAWLS using any LAN-to-WAN access protocol, including ISDN, SDLC, and asynchronous protocols. The router portion of the CRAWLS cooperates with the LAN switch and WAN switch portions to generate a MAC address proxy for use in lieu of the router's internal address. The proxy address is registered with the LAN switch portion of the CRAWLS and a redirect protocol is sent to the source. As a result, frames sent to the LAN switch with the proxy address are passed directly to the WAN switch. If practical, the CRAWLS may be enhanced for cut through by causing the WAN switch to transmit the frames as soon as the port is available. However, cut through will not be practical if the WAN transmission speed is faster than the speed at which the WAN switch receives frames from the LAN switch.

Figure 13:
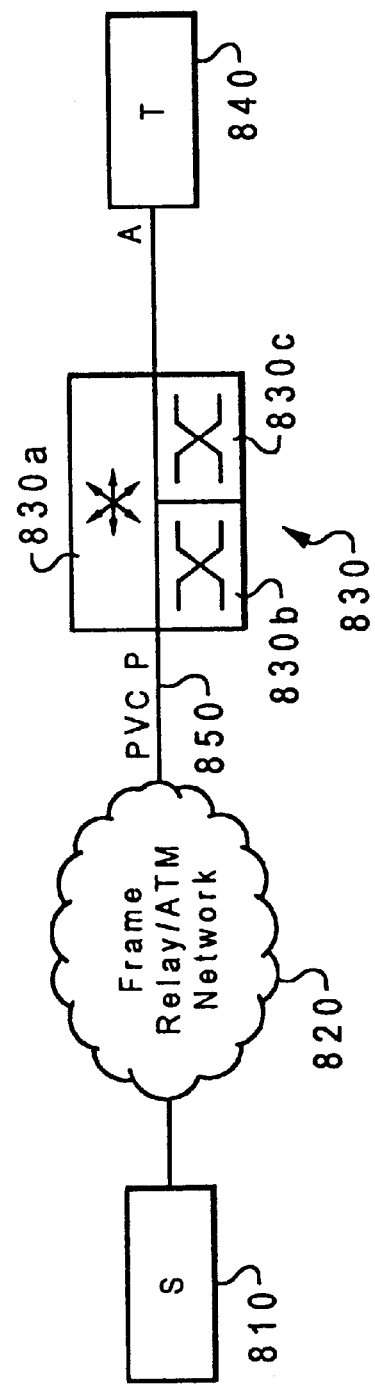
FIGS. 13 and 14 are block diagrams of portions of WAN-to-LAN network connections containing a CRAWLS in accordance with a preferred embodiment of the present invention.

With minor modifications, the methods described above may be applied to WAN-to-LAN traffic using various WAN-to-LAN access protocols. Referring to FIG. 13, a portion of a WAN-to-LAN network connection containing a CRAWLS in accordance with a preferred embodiment of the present invention is illustrated. The portion of interest 800 of the WAN-to-LAN connection shows a source 810 within the WAN sending frames through WAN network 820 to target 840 in the LAN via CRAWLS 830. CRAWLS 830 includes router 830a, WAN switch 830b (which may be either a frame relay or ATM switch), and LAN switch 830c.

As with LAN-to-WAN traffic, if the frame relay traffic in the WAN-to-LAN connection is bridged LAN traffic in accordance with RFC 1490, the procedures described above for LAN-to-LAN connections may be applied to the WAN-to-LAN connection. Again, however, another MACAP method specific to frame relay may be applied to WAN-to-LAN connections which are frame relay direct traffic. Source 810 is sending frame traffic over PVC P 850 to router 830a via frame relay switch 830b. Router 830a sends a redirect protocol over the same PVC P 850 to source 810 providing the next MAC address to use in order to bypass router 830a. The redirect protocol notes which traffic is to be sent to MAC address A of target 840. Source 810 takes frames formerly being sent as direct frames to router 830a and forwards them as bridged LAN frames to destination MAC address A of target 840 using the same PVC P 850 as before. Frame relay switch 830b passes bridged LAN frames directly to LAN switch 830c, which uses LAN switch technology to forward the frames to target 840.

Figure 14:
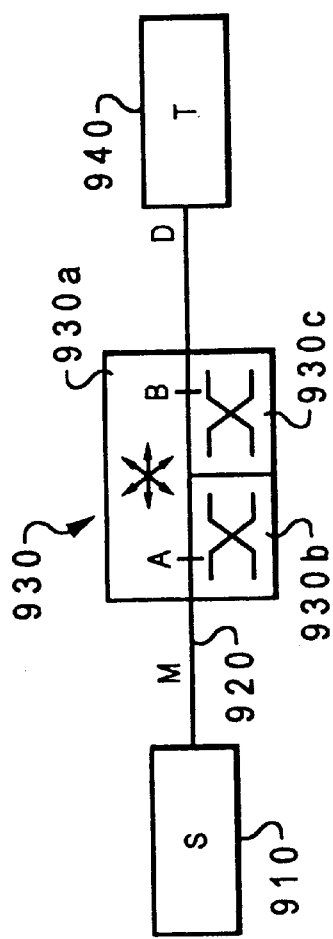

With reference now to FIG. 14, a portion of a WAN-to-LAN network connection containing a CRAWLS in accordance with a preferred embodiment of the present invention is illustrated for the instance where WAN-to-LAN access is in ATM protocol. The portion of interest 900 includes source 910 sending frame traffic down VC M 920 to router 930a within CRAWLS 930. Router 930a is accessed from the WAN by internal ATM router address A and forwards frame traffic to target 940 from internal router MAC address B. LAN switch 930c within CRAWLS 930 also has internal ATM address C for receiving frame traffic from ATM switch 930b. Source 910 sends frames to target 940 via router 930a by sending ATM (frame) cells along VC M 920 to internal ATM address A of router 930a within CRAWLS 930. Router 930a permits cut through by cooperating with ATM switch 930b and LAN switch 930c to reserve a virtual circuit identification—VPI/VCI (virtual path identifier/virtual circuit identifier—for a new VC M' which maps to the MAC address D of target 940. As described below in the context of WAN-to-WAN ATM cut through, the redirect protocol sent by router 930a to source 910 treats LAN switch 930c as the target ATM address, and router 930a cooperates with ATM switch 930b on the cut through. However, router 930a also registers the VPI/VCI-to-MAC address mapping in LAN switch 930c, mapping M' to D, the MAC address of target 940. Thus the methods of signaling/provisioning cut through described below in the context of ATM-to-ATM cut throughs are also applicable in the WAN-to-LAN, ATM protocol environment.

Although "virtual circuit" was used above, those skilled in the art will recognize that "virtual path" may be readily substituted. That is, "virtual circuit" and "virtual path" in ATM nomenclature are interchangeable for the purposes of this description.

If WAN switch 930b were a frame relay switch rather than an ATM switch, the methods described above may be readily adapted with little substantive difference. Frame relay protocol merely uses data link circuit identifiers (DLCIs) and entire frames rather than VPI/VCIs and cells like ATM. The signaling/provisioning cut through methods described below with respect to frame-relay-to-frame-relay cut throughs may also be applied in the WAN-to-LAN, frame relay environment.

WAN-to-WAN

Figure 15:
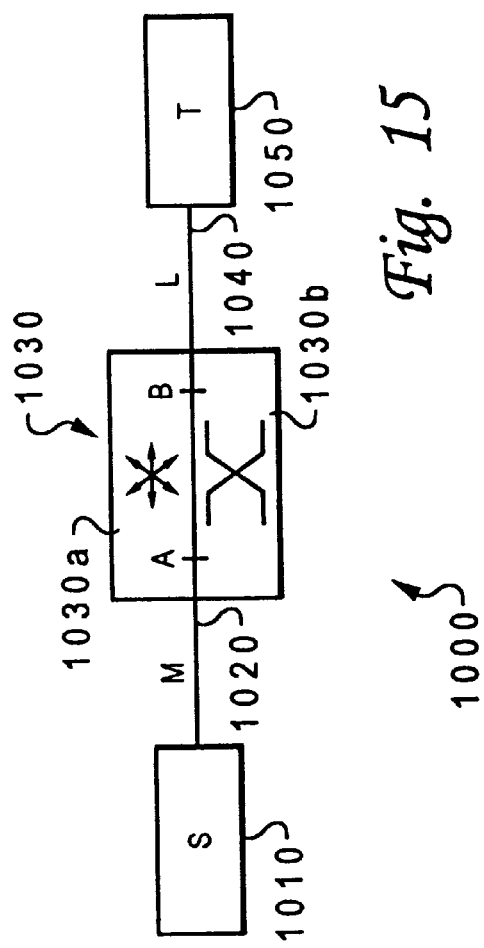
FIG. 15 depicts a block diagram of a portion of a network containing a CRAWLS for ATM-to-ATM or frame-relay-to-frame-relay cut throughs in accordance with a preferred embodiment of the present invention.

The phrase "WAN-to-WAN" is a nonsequitur used herein to designate transmitting frames within a CRAWLS between "WAN" protocols (i.e., frame relay, ATM, etc.). Referring to FIG. 15, a portion of a network containing a CRAWLS for an ATM-to-ATM cut through in accordance with a preferred embodiment of the present invention is depicted. In the network portion of interest 1000, source 1010 sends ATM (frame) cells along VC M 1020 to internal ATM address A of router 1030a in CRAWLS 1030. Router 1030a routes frames out its ATM address B along VC L 1040 to target 1050. In order to effect cut through, router 1030a cooperates with ATM switch 1030b in CRAWLS 1030 to reserve a VPI/VCI mapping a new VC M' from source 1010 to VC L 1040, effectively creating a VC from source 1010 to target 1050. Router 1030a sends a redirect protocol informing source 1010 of the availability of new VC M' without using the signaling procedures normally required by ATM ("signaling cut through"). The redirect protocol sent by router 1030a to source 1010 contains the VPI/VCI $V_{m'}$ identifying the reserved VPI/VCI within CRAWLS 1030.

In ATM networks, signaling messages are conveyed by out-of-band signaling techniques in dedicated SVCs to establish, maintain, or release an ATM virtual circuit connection (VCC) and virtual path connection (VPC) for data transfer. The signaling between nodes conventionally required to establish a new VC is unnecessary in the cut through method described above. When cells from source 1010 are received in ATM switch 1030b within CRAWLS 1030, cells with VPI/VCI $V_{m'}$ are automatically switched to VC L 1040 with the appropriate VPI/VCI $V_L$, cutting through CRAWLS 1030 without further signaling by router 1030a or ATM switch 1030b.

The redirect protocol sent by router 1030a to source 1010 may also include signaling-type information other than the VPI/VCI $V_{m'}$, including bandwidth and quality of service (QoS) parameters. Again, "virtual circuit" and "virtual path" are viewed as interchangeable herein. Furthermore, the additional circuits and/or paths created may be SVCs or PVCs, and will be identified by type in the redirect protocol. Since the bypass of signaling procedures for SVCs was termed "signaling cut through," the similar bypass of provisioning procedures for PVCs may be equivalently termed "provisioning cut through."

Source 1010 and target 1050 may also be CRAWLS. Target 1050 may therefore send a redirect protocol to router 1030a. If the traffic or data flow which is the subject of the redirect protocol from target 1050 is identical to redirected traffic already being cut through CRAWLS 1030 from source 1010, router 1030a cooperates with ATM switch 1030b to update the circuit mapping table contained in ATM switch 1030b. VC M' is mapped to new VC L' by linking $V_{m'}$ to $V_{L'}$. Switch 1030b completes the update to internal circuit mapping tables only when the last cell of the frame presently being switched is detected.

If the redirect protocol sent by target 1050 embraces frame traffic from multiple sources, then router 1030a cooperates with ATM switch 1030b to update the circuit mapping for each of those sources, resulting in a funneling of traffic from multiple sources into VC L'. If the redirect protocol from target 1050 splits frame traffic presently sent along VC M and/or M' to L and L', router 1030b may send another redirect protocol to source 1010 and cooperate with ATM switch 1030b to reapportion traffic appropriately. Source 1010 may be directed to send some portion of the traffic along VC M" instead. Switch 1030b may thus map M" to L and M' to L', where source 1010 reapportions traffic not addressed by the redirect protocol from target 1050 (as relayed by in the redirect protocol from router 1030a) onto M".

Referring back to FIG. 15, the same portion of a network containing a CRAWLS depicted may be used for a frame-relay-to-frame-relay cut through in accordance with a preferred embodiment of the present invention. Instead of an ATM switch, switch 1030b in a frame relay switch. The methods described above with respect to ATM-to-ATM cut through apply equally to frame-relay-to-frame-relay cut through, except DLCIs and entire frames are used in place of VPI/VCIs and cells. Although the frame relay protocol has classically used PVCs, some frame relay architectures use SVCs. Thus the benefits of both signaling and provisioning cut through may be obtained in the frame-relay-to-frame-relay context as well.

With reference now to FIG. 16, a network portion containing a CRAWLS for ATM-to-frame-relay cut through in accordance with a preferred embodiment of the present invention is illustrated. The portion of interest 1100 includes a source 1110, CRAWLS 1130, and target 1150. Router 1130a within CRAWLS 1130 communicates with ATM switch 1130b using internal address A and with frame relay switch 1130c using internal address B. Source 1110 sends frames to target 1150 via router 1130a by sending ATM (frame) cells along VC M 1120 to internal ATM address A of router 1130a within CRAWLS 1130. Router 1130a permits cut through by cooperating with ATM switch 1130b and frame relay switch 1130c to reserve a VPI/VCI $V_{m'}$ for a new VC M' which maps to the internal ATM address C of frame relay switch 1130c. VPI/VCI $V_{m'}$ maps to the DCLI of VC L 1140 in the circuit mapping tables of frame relay switch 1130c.

Referring to FIG. 17, a network portion containing a CRAWLS for frame-relay-to-ATM cut through in accordance with a preferred embodiment of the present invention is depicted. The portion of interest 1200 includes a source 1210, CRAWLS 1230, and target 1250. Router 1230a within CRAWLS 1230 communicates with frame relay switch 1230b using internal address A and with ATM switch 1230c using internal address B. Source 1210 sends frames to target 1250 via router 1230a by sending ATM (frame) cells along VC M 1220 to internal address A of router 1230a within CRAWLS 1230. For bridged LAN frame relay traffic in accordance with RFC 1490, the same methods used for LAN-to-WAN, ATM protocol connections described above may be applied, with the simple modification that source 1210 sends frame traffic to frame relay switch 1230b via a PVC rather than using a proxy MAC address. For frame relay direct traffic, a frame-relay-to-ATM cut through may be accomplished in the same manner described above with respect to frame relay direct, WAN-to-LAN connections to convert to bridge LAN traffic, using a MACAP format MAC address in the redirect protocol. Signaling/provisioning cut through may be achieved by registering a new VC L' in the circuit mapping tables of frame relay switch 1230b, where the DCLI of VC L 1240 will map to VPI/VCI $V_{L'}$.

Figure 18:
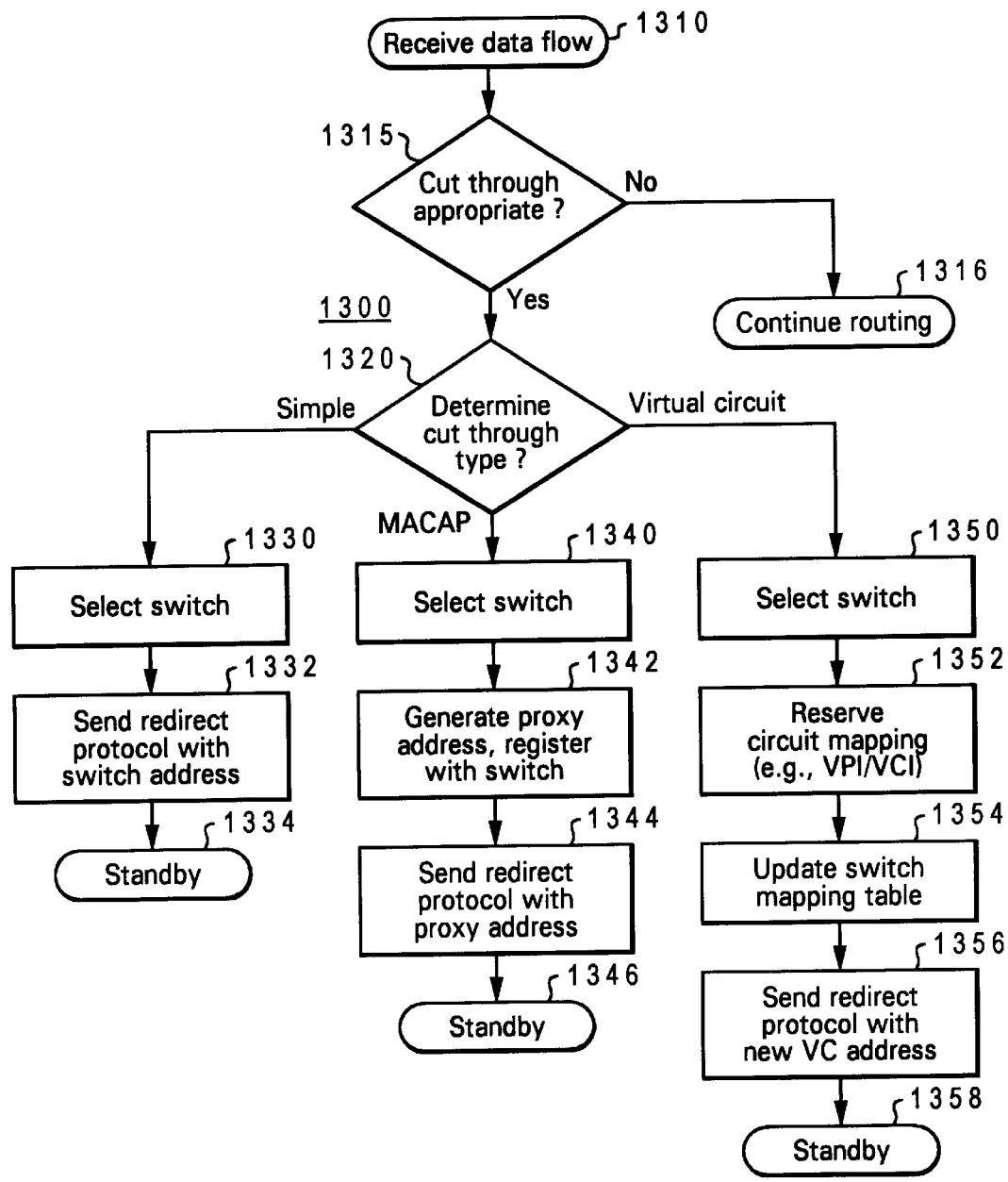
FIG. 18 is a high level flowchart for the operation of a CRAWLS such as that shown in FIG. 9 in accordance with a preferred embodiment of the present invention.

With reference now to FIG. 18, a high level flowchart for the operation of a CRAWLS such as that shown in FIG. 9 in accordance with a preferred embodiment of the present invention is illustrated. Those skilled in the art will recognize that a similar process may be employed in conjunction with other combined routers and switches, such as that of FIG. 8.

The process 1300 by which the CRAWLS initiates cut through begins at step 1310, which depicts receipt of a data flow by a router within the CRAWLS. The process then proceeds to step 1315 which illustrates a determination of whether the data flow is of a type appropriate for cut through as described earlier. If the data flow is not appropriate for cut through, the process passes to step 1316, which illustrates continued routing of the data flow.

Referring back to step 1316, if the data flow is found to be appropriate for cut through, the process passes next to step 1320, which illustrates a determination of the type of cut through which should be used. If simple cut through may be used, the process then passes to step 1330, which depicts selection of the appropriate switch within CRAWLS to be used for cut through. The process then proceeds to step 1332, which illustrates sending a redirect protocol to the source containing the selected switch address, and then to step 1334, which depicts the router standing by after the data flow is cut through in case a problem requires the data flow to be routed once again.

With reference again to step 1320, if MACAP cut through is required, the process passes instead to step 1340, which illustrates selection of the appropriate cut through switch within the CRAWLS. The process then proceeds to step 1342, which depicts the generation of a proxy address and the registration of the proxy address within the selected switch. The process then passes to step 1344, which illustrates sending a redirect protocol to the source containing the proxy address, and then to step 1346, which depicts the router standing by in case routing is again required.

Referring again to step 1320, if cut through requires the use of virtual circuits, the process passes to step 1350, which illustrates selection of the appropriate cut through switch within the CRAWLS for linking the desired virtual circuits. The process then proceeds to step 1352, which depicts reservation of the necessary circuit (e.g., VPI/VCI or DCLI) mapping by the CRAWLS, and then to step 1354, which illustrates updating the virtual circuit mapping table within the selected switch. The process next passes to step 1356, which depicts sending a redirect protocol to the source containing the address to the newly-created virtual circuit, and then to step 1358, which illustrates the router standing by in the unlikely event that the new virtual circuit fails.

While the invention has been particularly shown and described with reference to a preferred embodiment, it will be understood by those skilled in the art that various changes in form and detail may be made therein without departing from the spirit and scope of the invention.

I claim:

1. A method of providing a combined router and switch cut through for optimizing delivery of a data flow between a source and a destination in a data processing system network, comprising:

storing and forwarding a first portion of the data flow from the source to the destination by a router within the combined router and switch;

determining that the data flow is suitable for cut through;

determining a cut through type needed for the data flow;

sending a redirect protocol conforming to the cut through type needed for the data flow to the source; and receiving and passing through a second portion of the data flow by a switch within the combined router and switch.

2. The method of claim 1, further comprising:

responsive to a failure of the switch to complete delivery of the data flow by passing through the second portion of the data flow, storing and forwarding a third portion of the data flow by the router.

3. The method of claim 1, further comprising:

responsive to an inability of the switch to pass through the data flow to the destination, storing and forwarding the second portion of the data flow by the router.

4. The method of claim 1, further comprising:

responsive to determining the cut through type needed for the data flow:

mapping a new connection within the combined router and switch between the source and the destination; and sending a selected switch address, a proxy address, or a virtual circuit address for the new connection in the redirect protocol.

5. The method of claim 4, wherein the step of mapping a new connection comprises generating and registering a proxy address for the data flow.

6. The method of claim 4, wherein the step of mapping a new connection comprises mapping a switched virtual circuit for the data flow.

7. The method of claim 4, wherein the step of mapping a new connection comprises mapping a permanent virtual circuit for the data flow.

8. The method of claim 4, wherein the step of mapping a new connection further comprises:

mapping a switched virtual circuit within the switch from the source to a virtual circuit for the destination without employing a conventional signaling procedure with other switching devices used to create switched virtual circuits for a data transfer protocol being employed for the data flow.

9. The method of claim 4, wherein the step of mapping a new connection further comprises:

mapping a permanent virtual circuit within the switch without employing a conventional provisioning procedure with other switching devices used to create permanent virtual circuits for a data transfer protocol being employed for the data flow.

10. A method for efficiently transferring a plurality of data packets from a source node to a destination node, comprising:

receiving a first data packet from the plurality of data packets from the source node at an intermediate node;

sending the first data packet to the destination node along a path selected by utilizing the data within the first data packet;

selecting a cut through type for a data transfer protocol employed for the plurality of data packets;

sending a redirect packet from the intermediate node to the source node, wherein the redirect packet includes switching information for cut through transmission employing the selected cut through type of subsequent data packets within the plurality of data packets by the intermediate node; and sending data from a subsequent data packet from the plurality of data packets, as the data is received at the intermediate node, to the destination node.

11. The method of claim 10, further comprising:

sending an identification of an alternate path to the source node if the alternate path differs from a path identified by routing information within the first data packet.

12. The method of claim 11, further comprising:

after the sending of the identification, sending data from data packets from a remaining portion of the plurality of data packets, as the data is received at the intermediate node, to the destination node along the alternate path.

13. A method of data transfer cut through failure recovery, comprising:

receiving and temporarily storing a first data packet from a data transfer from a source node at an intermediate node;

sending the first data packet to a destination node along a selected path selected by selected based upon routing data within the first data packet;

sending a redirect packet containing switching information for cut through transmission at the intermediate node from the intermediate node to the source node;

switching and immediately transmitting each subsequent data packet within the data transfer, as the data packets are received at the intermediate node, along an alternate path within the intermediate node to the destination node; and in response to a failure of the alternate path, sending data packets from the remaining portion of the data transfer to the destination node along the selected path.

14. A method of data transfer cut through recovery, comprising:

receiving and temporarily storing a first data packet from a data transfer from a source node at an intermediate node;

sending the first data packet to a destination node along a selected path selected by selected based upon routing data within the first data packet;

sending a redirect packet containing switching information for cut through transmission at the intermediate node from the intermediate node to the source node;

switching and immediately transmitting each subsequent data packet within the data transfer, as the data packets are received at the intermediate node, along an alternate path within the intermediate node to the destination node; and in response to an inability to immediately send the data packets within a remaining portion of the data transfer as the data packets are received at the intermediate node to the destination node, sending the data packets from the remaining portion of the data transfer to the destination node when possible.

15. A apparatus for efficiently transferring a plurality of data packets from a source node to a destination node in a distributed data processing system comprising:

receiving means for receiving a first data packet from the plurality of data packets from the source node at an intermediate node;

first sending means for sending the first data packet to the destination node along a path selected by utilizing the data within the first data packet;

selection means for selecting a cut through type based upon a data transfer protocol being employed for the plurality of data packets;

redirect means for sending a redirect packet from the intermediate node to the source node, wherein the redirect packet includes switching information for cut through transmission employing the selected cut through type of subsequent data packets within the plurality of data packets by the intermediate node; and second sending means for sending data from a subsequent data packet from the plurality of data packets, as the data is received at the intermediate node, to the destination node.

16. The apparatus of claim 15, further comprising:

third sending means for sending an identification of an alternate path to the source node if the alternate path differs from a path identified by routing information within the first data packet.

17. The apparatus of claim 16, further comprising:

third sending means for, after the sending of the identification, sending data from data packets from a remaining portion of the plurality of data packets, as the data is received at the intermediate node, to the destination node along the alternate path.

18. The apparatus of claim 17, further comprising:

fourth sending means for, in response to a failure of the alternate path, sending data packets from the remaining portion of the plurality of data packets to the destination node along the selected path.

19. The apparatus of claim 17, further comprising:

fourth sending means for, in response to an inability to send the data from data packets from the remaining portion of the plurality of data packets, as the data is received at the intermediate node, to the destination node, sending the data packets from the remaining portion of the plurality of data packets to the destination node when possible.

* * * * *